(12) United States Patent
Haraldsson

(10) Patent No.: US 8,500,946 B2
(45) Date of Patent: Aug. 6, 2013

(54) FIN SEAL CONTAINER AND METHOD

(75) Inventor: Rune K Haraldsson, Garner, NC (US)

(73) Assignee: MeadWestvaco Corporation, Richmond, VA (US)

(*) Notice: Subject to any disclaimer, the term of this patent is extended or adjusted under 35 U.S.C. 154(b) by 332 days.

(21) Appl. No.: 12/887,691

(22) Filed: Sep. 22, 2010

(65) Prior Publication Data
US 2012/0067882 A1 Mar. 22, 2012

(51) Int. Cl.
*B32B 37/00* (2006.01)
*B29C 65/00* (2006.01)

(52) U.S. Cl.
USPC ..... 156/322; 156/227; 156/308.2; 156/308.4; 53/457; 53/477; 53/491; 493/183; 493/453

(58) Field of Classification Search
USPC ............ 156/198, 227, 308.2, 308.4, 309.9, 156/322, 497, 499, 69, 217, 221; 493/183, 493/184, 452, 453, 129, 133; 53/457, 458, 53/477, 476, 484, 491, 373.2, 373.3, 373.7, 53/376.6, 382.2
See application file for complete search history.

(56) References Cited

U.S. PATENT DOCUMENTS

| | | | |
|---|---|---|---|
| 2,575,544 A | 11/1951 | Zinn | |
| 3,002,328 A | 10/1961 | Monroe et al. | |
| 3,207,049 A | 9/1965 | Monroe et al. | |
| 3,613,527 A | 10/1971 | Hentges et al. | |
| 3,823,438 A | 7/1974 | Webber et al. | |
| 4,189,986 A * | 2/1980 | Silver | 493/96 |
| 4,450,581 A | 5/1984 | Hirata | |
| 5,289,939 A | 3/1994 | Gordon et al. | |
| 5,383,835 A | 1/1995 | Gordon et al. | |
| 5,630,308 A | 5/1997 | Guckenberger | |
| 5,632,402 A | 5/1997 | Walsh et al. | |
| 5,632,404 A | 5/1997 | Walsh | |
| 5,746,871 A | 5/1998 | Walsh | |
| 5,783,030 A | 7/1998 | Walsh | |
| 5,794,811 A | 8/1998 | Walsh | |
| 5,794,812 A | 8/1998 | Walsh | |

(Continued)

FOREIGN PATENT DOCUMENTS

| | | |
|---|---|---|
| EP | 1338403 | 8/2003 |
| EP | 1338521 | 8/2003 |

(Continued)

OTHER PUBLICATIONS

International Search Report and Written Opinion issued in PCT/US2011/050904 (2012).

*Primary Examiner* — John Goff
(74) *Attorney, Agent, or Firm* — MWV Intellectual Property Group

(57) ABSTRACT

A method for assembling a fin seal container including folding a container blank into a three-dimensional body that defines an internal volume and includes an end portion that defines an opening into the internal volume, the end portion including a first fin seal panel having inner and outer major surfaces and a second fin seal panel having inner and outer major surfaces, folding the end portion such that the inner major surface of the first fin seal panel is positioned adjacent to the inner major surface of the second fin seal panel, separating the first fin seal panel from the second fin seal panel, treating the inner major surface of the first fin seal panel and/or the inner major surface of the second fin seal panel, and pressing the first fin seal panel into engagement with the second fin seal panel.

13 Claims, 7 Drawing Sheets

(56) References Cited

U.S. PATENT DOCUMENTS

| | | |
|---|---|---|
| 5,857,614 A | 1/1999 | Walsh |
| 5,911,359 A | 6/1999 | Stone et al. |
| 6,062,470 A | 5/2000 | Robichaud |
| 6,098,874 A | 8/2000 | Tokarski |
| 6,131,806 A | 10/2000 | Hess et al. |
| 6,221,192 B1 | 4/2001 | Walsh |
| 6,241,646 B1 | 6/2001 | Tokarski |
| 6,352,096 B1 | 3/2002 | Walsh |
| 6,386,438 B1 | 5/2002 | Wash et al. |
| 6,419,152 B1 | 7/2002 | Tokarski |
| 6,688,515 B1 | 2/2004 | Huffman et al. |
| 6,766,941 B1 | 7/2004 | Tokarski |
| 6,854,639 B2 | 2/2005 | Walsh |
| 6,957,763 B2 | 10/2005 | Huffman et al. |
| 7,036,714 B2 | 5/2006 | Walsh et al. |
| 7,097,092 B1 | 8/2006 | Marrale |
| 7,097,093 B2 | 8/2006 | Darin et al. |
| 7,210,612 B2 | 5/2007 | Walsh et al. |
| 2002/0190072 A1 | 12/2002 | Strange |
| 2004/0026490 A1 * | 2/2004 | Jeppson et al. ............... 229/137 |

FOREIGN PATENT DOCUMENTS

| | | |
|---|---|---|
| GB | 728396 | 4/1955 |
| GB | 742130 | 12/1955 |
| JP | 8 301208 | 11/1996 |
| WO | WO 02/30762 | 4/2002 |

* cited by examiner

FIN SEAL CONTAINER AND METHOD

FIELD

This application relates to fin seal containers. More particularly, this application relates to fin seal containers, pre-cut blanks for forming fin seal containers and methods for assembling fin seal containers.

BACKGROUND

Fin seal containers have been used as alternatives to extruded plastic containers, cans and the like for packaging various products, such as consumer goods and food-stuffs. For example, fin seal containers constructed from paperboard-based substrates having a sufficient barrier layer (e.g., a moisture barrier layer and/or an oxygen barrier layer) have been used to package liquid food-stuffs, such as milk and soup, as well as dry food-stuffs, such as grains and cereals.

Fin seal containers are traditionally formed from a pre-cut substrate blank, such as a pre-cut paperboard blank. Two ends of the blank are typically connected at a seam to form a three-dimensional (e.g., tubular) structure having an internal volume that is open at opposite ends of the structure. During packaging, a first open end of the structure is typically sealed, such as with a fin seal, to partially enclose the internal volume prior to introducing the product. Then, the product is introduced to the internal volume of the structure by way of the second open end. Finally, once the internal volume has been filled as desired, the second open end is sealed with a fin seal.

Traditionally, fin seal containers are formed from substrates that have been coated on their inner and/or outer surfaces with a heat-sealable material. Therefore, the fin seal may be formed by pressing two opposing end portions of the container structure between heated platens for a sufficient amount of time. During the pressing operation, heat from the platens is transferred through the substrate to melt (or at least tackify) the heat-sealable material such that the pressure applied by the heated platens bonds together the two opposing end portions of the container structure to form a fin-shaped seal.

Thus, the speed at which product may be packaged is limited by the sealing step, specifically the time required to transfer sufficient heat from the heated platens to the heat-sealable material on the inner surface of the substrate. While increasing the surface temperature of the heated platens may increase heat flux and, thus, speed-up the packaging process, platen temperatures that are too high may degrade or damage the package.

Accordingly, those skilled in the art continue with research and development efforts in the field of fin seal containers.

SUMMARY

In one aspect, the disclosed method for assembling a fin seal container may include the steps of (1) folding a container blank into a three-dimensional body that defines an internal volume and includes an end portion that defines an opening into the internal volume, the end portion including a first fin seal panel having inner and outer major surfaces and a second fin seal panel having inner and outer major surfaces, (2) folding the end portion such that the inner major surface of the first fin seal panel is positioned adjacent to the inner major surface of the second fin seal panel, (3) separating the first fin seal panel from the second fin seal panel, (4) treating the inner major surface of the first fin seal panel and/or the inner major surface of the second fin seal panel, and (5) pressing the first fin seal panel into engagement with the second fin seal panel In another aspect, the disclosed method for assembling a fin seal container may include the steps of (1) folding a container blank into a three-dimensional body that defines an internal volume and includes an end portion that defines an opening into the internal volume, the end portion including a first fin seal panel having an extension portion, a pre-formed fold line, an inner major surface and an outer major surface and a second fin seal panel having inner and outer major surfaces, wherein the inner major surface of the first fin seal panel and the inner major surface of the second fin seal panel are coated with a heat-sealable material, (2) folding the end portion such that the inner major surface of the first fin seal panel is positioned adjacent to, and in generally parallel alignment with, the inner major surface of the second fin seal panel, (3) engaging the extension portion to pivot the first fin seal panel about the pre-formed fold line away from the second fin seal panel, (4) after the engaging step, heat-treating the inner major surface of said first fin seal panel and/or the inner major surface of the second fin seal panel, and (5) after the heat-treating step, pressing the first fin seal panel into engagement with the second fin seal panel.

In another aspect, the disclosed container blank may include a pre-cut substrate having an outer periphery, the substrate being provided with a plurality of pre-formed fold lines, the fold lines defining a plurality of side wall panels, a first end portion and a second end portion, the side wall panels being positioned between the first and second end portions, the fold lines further defining a plurality of transition panels, a first fin seal panel, a first portion of a second fin seal panel and a second portion of the second fin seal panel at the first end portion, wherein the first fin seal panel, the first portion of the second fin seal panel and the second portion of the second fin seal panel include sealing surfaces, and wherein the sealing surfaces are substantially free of pre-formed fold lines that extend from the outer periphery to the side wall panels and/or the transition panels.

In yet another aspect, disclosed is a fin seal container formed from the disclosed methods and/or the disclosed container blanks.

Other aspects of the disclosed fin seal container and method will become apparent from the following description, the accompanying drawings and the appended claims.

DETAILED DESCRIPTION

It has now been discovered that a fin seal container may be assembled and sealed more efficiently by directly heating the inner surfaces of the opposed panels that form the fin-shaped seal of the fin seal container, thereby melting (or at least tackifying) the heat-sealable material more rapidly and, therefore, increasing overall production speed. As an alternative to using heat-sealable materials, and in lieu of the heat treating step, an adhesive may be directly applied to the inner surfaces of the opposed panels that form the fin-shaped seal.

It has also been discovered that the probability of leak formation in fin seal containers may be significantly reduced by substantially eliminating pre-formed fold lines from the sealing surfaces of the container blank.

Figure 1:
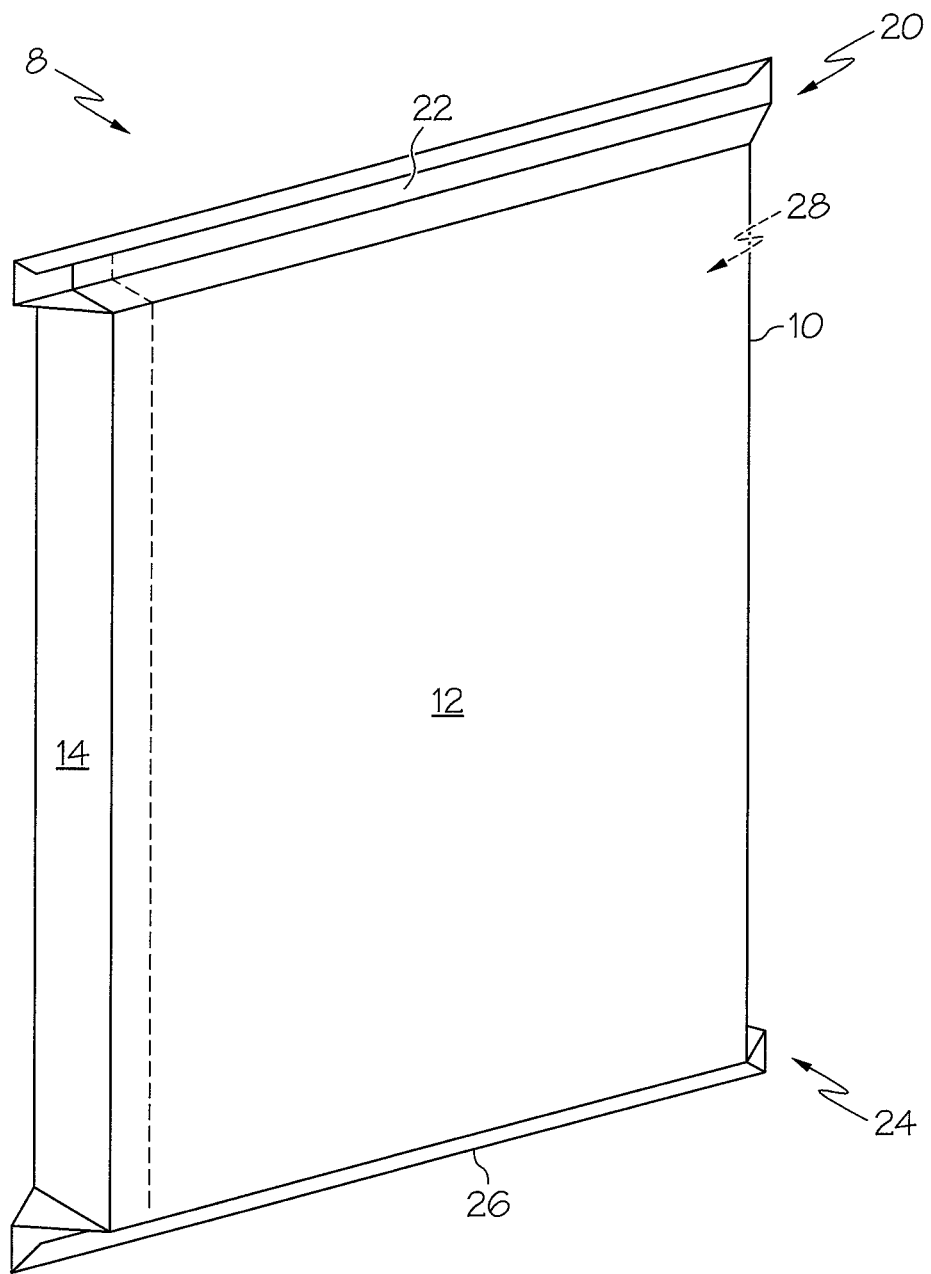
FIG. 1 is a front perspective view of one aspect of the disclosed fin seal container.
Figure 2:
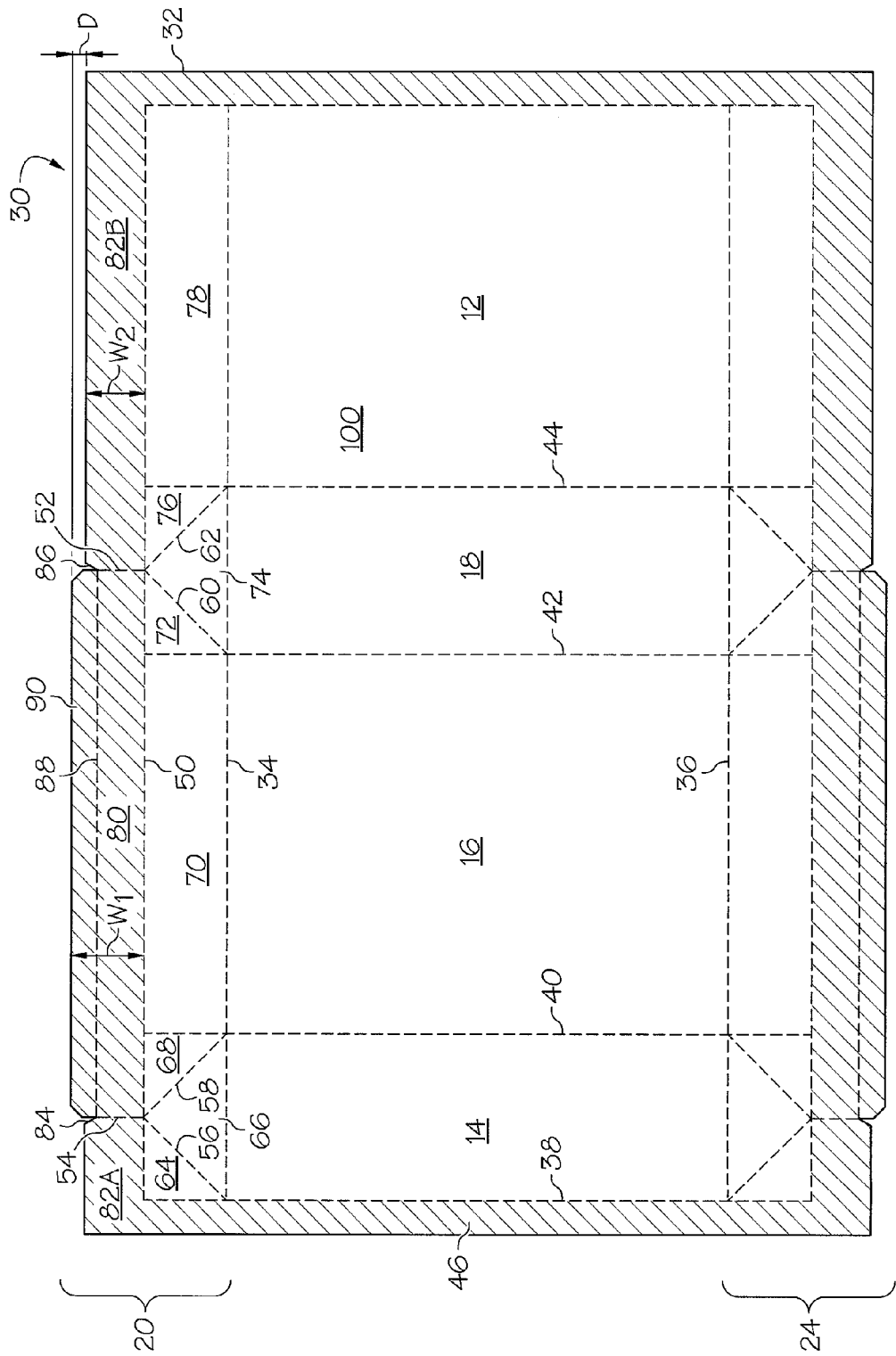
FIG. 2 is a top plan view of a pre-cut container blank used to form the fin seal container of FIG. 1.

Referring to FIG. 1, one aspect of the disclosed fin seal container, generally designated 8, may be formed as a three-dimensional rectilinear body 10 having four side wall panels 12, 14, 16, 18 (only panels 12 and 14 are shown in FIG. 1; panels 16 and 18 are shown in FIG. 2) a first end portion 20 sealed with a first fin seal 22 and a second, opposite end portion 24 sealed with a second fin seal 26. The body 10 of the fin seal container 8 may define an internal volume 28, and the internal volume 28 may receive a product (not shown) therein.

At this point, those skilled in the art will appreciate that the size and shape of the body 10 of the container 8 may vary to accommodate products of various sizes and shapes. The rectilinear body 10 shown in FIG. 1 is only one specific example of a suitable body for the disclosed fin seal container 8.

The disclosed fin seal container 8 may be formed from a container blank that has been pre-cut from a substrate sheet. In one particular implementation, the disclosed fin seal container 8 may be formed from the container blank 30 shown in FIG. 2. Other types of container blanks may be used without departing from the scope of the present disclosure.

The container blank 30 shown in FIG. 2 may be pre-cut from a sheet of substrate material and may include an outer periphery 32 and a plurality of pre-formed fold lines 34, 36, 38, 40, 42, 44 that define the side wall panels 12, 14, 16, 18 and the end portions 20, 24 of the fin seal container 8 shown in FIG. 1. Specifically, side wall panel 12 may be defined by fold lines 34, 36 and 44, side wall panel 14 may be defined by fold lines 34, 36, 38 and 40, side wall panel 16 may be defined by fold lines 34, 36, 40 and 42, side wall panel 18 may be defined by fold lines 34, 36, 42 and 44, the first end portion 20 may be defined by fold line 34, and the second end portion 24 may be defined by fold line 36. Additional fold line 38 may define a sealing panel 46.

Figure 6:
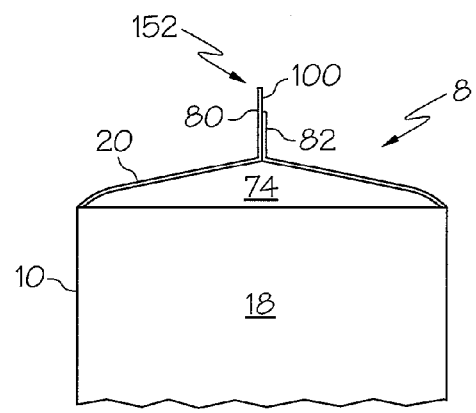
FIG. 6 is an end elevational view of the fin seal container of FIG. 5, shown after the end portion has been folded to a collapsed configuration.

The first end portion 20 may include additional pre-formed fold lines 50, 52, 54, 56, 58, 60, 62 that define transition panels 64, 66, 68, 70, 72, 74, 76, 78, the first fin seal panel 80 and the second fin seal panel 82 (comprised of panels 82A and 82B in FIG. 2). Specifically, the first fin seal panel 80 may be defined by fold lines 50, 52 and 54, the first portion of the second fin seal panel 82A may be defined by fold lines 50 and 54 and the second portion of the second fin seal panel 82B may be defined by fold lines 50 and 52. The transition panels 64, 66, 68, 70, 72, 74, 76, 78 may provide a transition region between the first 80 and second 82 fin seal panels and the side panels 12, 14, 16, 18, thereby allowing face-to-face approximation of the first 80 and second 82 fin seal panels during assembly, as shown in FIG. 6.

The first fin seal panel 80 may include an extension portion 90 that extends outward beyond the periphery 32 of the second fin seal panel 82 by a distance D. As one example, the width $W_2$ of the second fin seal panel 82 may be at most 90 percent of the width $W_1$ of the first fin seal panel 80. As another example, the width $W_2$ of the second fin seal panel 82 may be at most 75 percent of the width $W_1$ of the first fin seal panel 80. As yet another example, the width $W_2$ of the second fin seal panel 82 may be at most 60 percent of the width $W_1$ of the first fin seal panel 80.

Figure 7:
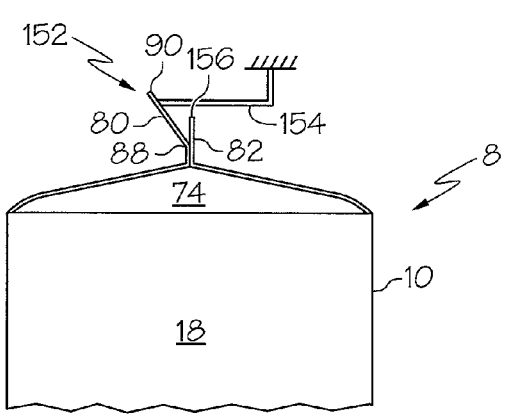
FIG. 7 is an end elevational view of the fin seal container of FIG. 6, shown during a separating step.

Optionally, the first fin seal panel 80 may be provided with cuts 84, 86 and a pre-formed fold line 88. Therefore, during assembly, the first fin seal panel 80 may pivot about fold line 88 when the first fin seal panel 80 is urged away from the second fin seal panel 82, as shown in FIG. 7 and discussed in greater detail below.

As shown in FIG. 2, the second end portion 24 of the container blank 30 may include the same or similar pre-formed fold lines as the first end portion 20. In an alternative aspect, the second end portion 24 of the body 10 of the container 8 may be sealed using a technique other than a fin seal.

In one expression, the sealing surfaces of the container blank 30 (i.e., the portions of the container blank 30 that are sealed to some other portion of the container blank 30) may be free (or substantially free) of pre-formed fold lines. In another expression, the sealing surfaces of the container blank 30 may be free (or substantially free) of pre-formed fold lines that extend to the outer periphery 32 of the container blank 30. In yet another expression, the sealing surfaces of the container blank 30 may be free (or substantially free) of pre-formed fold lines that extend from the outer periphery 32 of the container blank 30 to one or more of the transition panels 64, 66, 68, 70, 72, 74, 76, 78 or side wall panels 12, 14, 16, 18.

Without being limited to any particular theory, it is believed that eliminating pre-formed fold lines from the sealing surfaces of the container blank 30, or at least pre-formed fold lines that extend to the outer periphery 32 of the container blank 30 or from the outer periphery 32 of the container blank 30 to one or more of the transition panels 64, 66, 68, 70, 72, 74, 76, 78 or side wall panels 12, 14, 16, 18, may significantly reduce or eliminate the risk of channels, and hence leaks, being formed through the seals in the assembled container 8 (FIG. 1). Therefore, while it may be advantageous to ensure that every sealing surface of the container blank 30 is free of pre-formed fold lines, advantage may still be gained by ensuring that at least some, but not all, sealing surfaces are free of pre-formed fold lines.

In the container blank 30 of FIG. 2, the sealing surfaces are shown with cross-hatching. For example, the sealing surfaces may include the inner surface 100 of the first fin seal panel 80 (including or, alternatively, excluding the inner surface 100 of the extension portion 90) and the inner surface 100 of the second fin seal panel 82 (comprised of panels 82A, 82B prior to assembly). Additionally, the inner surface 100 and/or the outer surface 102 (FIG. 3) of the sealing panel 46, as well as the longitudinal edge of side panel 12 to which the sealing panel 46 is connected, may be considered sealing surfaces and treated as such. Of course, those skilled in the art will appreciate that only a portion of the area shown with cross-hatching may be used for sealing.

Figure 3:
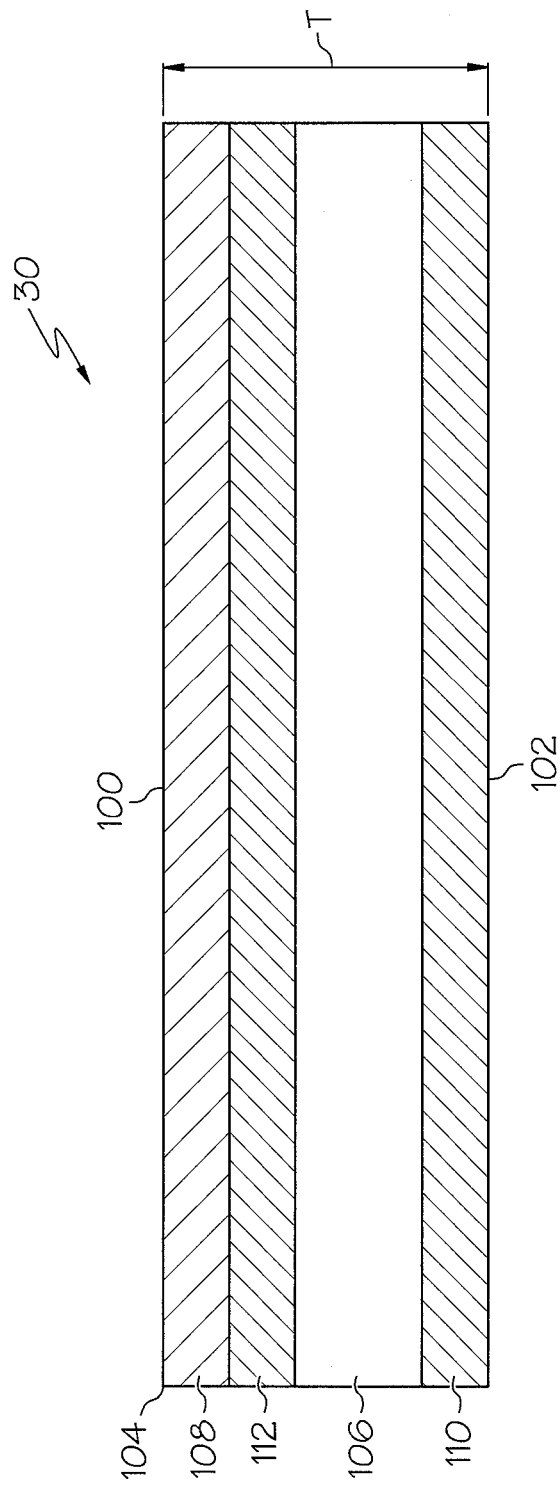
FIG. 3 is a cross-sectional view of a portion of the container blank of FIG. 2.

Referring to FIG. 3, the container blank 30 may be formed from a generally planar, sheet-like substrate having a first, inner major surface 100, a second, outer major surface 102 and a cross-sectional thickness T. In one general construction, the container blank 30 may be formed from a paperboard substrate, such as a paperboard substrate having a cross-sectional thickness T ranging from about 12 to 24 points (e.g., 16 points). In one specific construction, the container blank 30 may be formed as a layered structure 104. As an example, the layered structure 104 may include a paperboard layer 106 and a heat-sealable layer 108 (e.g., a layer of polyethylene) on the inner surface 100 of the structure 104. Optionally, a printable layer 110 (e.g., a clay coating) may be applied to the outer surface 102 of the structure 104 and, optionally, coated with an additional layer (not shown) of polymeric material. Additional optional layers 112 (e.g., a light barrier layer and/or an oxygen barrier layer) may be positioned between the paperboard layer 106 and the heat-sealable layer 108.

Figure 11:
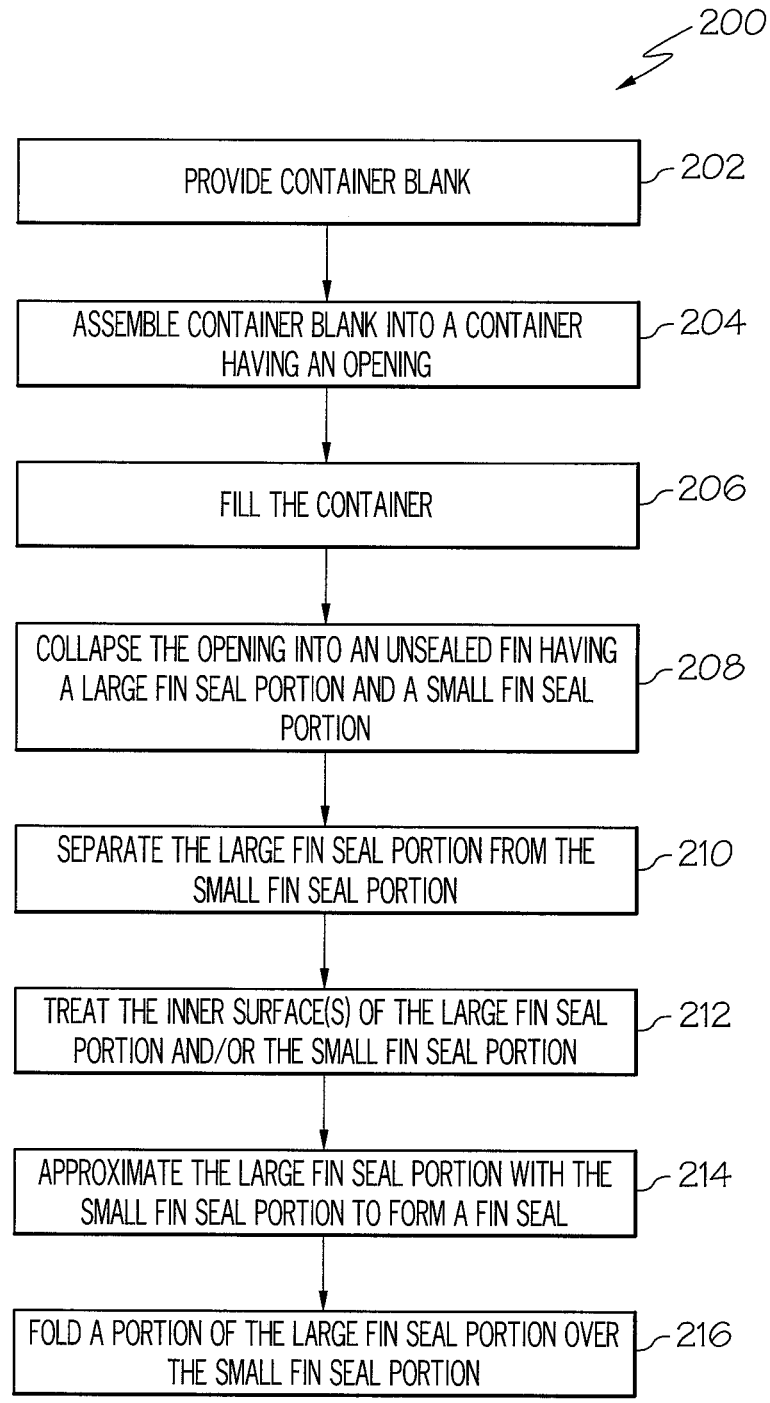
FIG. 11 is a flowchart that illustrates one aspect of the disclosed method for assembling a fin seal container.

Referring to FIG. 11, one aspect of the disclosed method for assembling a fin seal container, generally designated 200, may begin at block 202 with a container blank. While method 200 is described below with reference to the container blank 30 described above, those skilled in the art will appreciate that other container blanks may be used in the disclosed method 200 without departing from the scope of the present disclosure.

Figure 4:
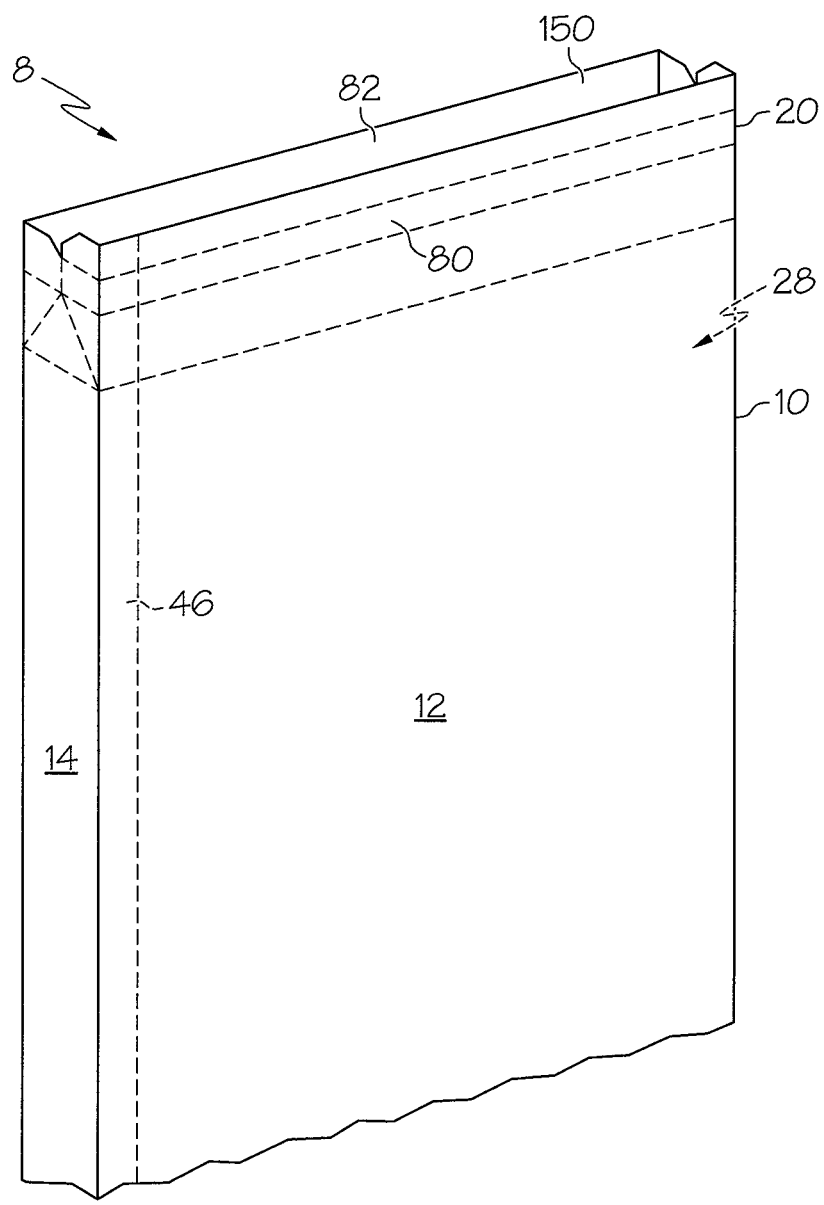
FIG. 4 is a front perspective view of a portion of a partially assembled container formed from the container blank of FIG. 2, the partially assembled container having an end portion that defines an opening.

At block 204, the container blank 30 may be folded into a three-dimensional body 10. As shown in FIGS. 2 and 4, the three-dimensional body 10 may be formed by folding the container blank 30 about fold lines 38, 40, 42, 44 and connecting the sealing panel 46 to the side wall panel 12. As an example, the sealing panel 46 may be heat sealed to the inner surface 100 (FIG. 3) of the side wall panel 12 by way of a heat sealing step (e.g., a heated platen).

Still referring to FIGS. 2 and 4, when the container blank 30 has been folded into the three-dimensional body 10, panel 82A may be connected to panel 82B to form the second fin seal panel 82. Therefore, as shown in FIG. 4, the first fin seal panel 80 and the second fin seal panel 82 may define an opening 150 into the internal volume 28 of the body 10. While only the first end portion 20 is shown in FIG. 4, those skilled in the art will appreciate that second end portion 24 may be similarly configured.

Figure 5:
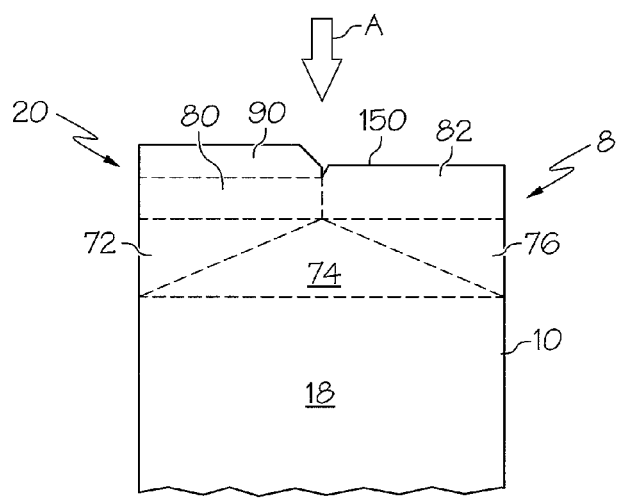
FIG. 5 is an end elevational view of the fin seal container of FIG. 4.

At block 206, product (not shown) may be inserted into the internal volume 28 of the body 10 by way of the opening 150, as shown by arrow A in FIG. 5. Prior to proceeding to block 206, an optional step may include sealing all but one end portion. For example, the second end portion 24 may be sealed prior to proceeding to block 206.

At block 208, a subsequent step of the assembly method 200 may include collapsing the opening 150 by folding the first end panel 20 such that the inner surface 100 of the first fin seal panel 80 may be positioned adjacent to, and in generally parallel alignment with, the inner surface 100 of the second fin seal panel 82. Therefore, the step shown in block 208 may result in the formation of a generally longitudinal, but unsealed, fin 152 at the first end portion 20, as shown in FIG. 6.

At block 210, after the opening 150 in the first end portion 20 has been collapsed, the first fin seal panel 80 may be urged away from the second fin seal panel 82 to expose the inner surfaces 100 of the first 80 and second 82 fin seal panels. The step 210 of urging the first fin seal panel 80 away from the second fin seal panel 82 may be performed in-line as the partially-assembled container 8 travels along an assembly line, which may be a continuous assembly line, an intermittent assembly line or the like.

As shown in FIG. 7, a catch 154 may be positioned to intersect the unsealed fin 152, specifically to engage the extension portion 90 of the first fin seal panel 80, thereby urging the first fin seal panel 80 away from the second fin seal panel 82. The catch 154 may be positioned in such a manner so as not to engage the second fin seal panel 82 as it engages the first fin seal panel 80.

Still referring to FIG. 7, as the first fin seal panel 80 is urged away from the second fin seal panel 82, the first fin seal panel 80 may pivot about the pre-formed fold line 88. The pre-formed fold line 88 may be positioned such that the pivot point (i.e., the fold line 88) is sufficiently below the edge 156 of the second fin seal panel 82 such that a sufficient amount of the inner surfaces 100 of the first 80 and second 82 fin seal panels are exposed during the step of block 210.

At block 212, the exposed inner surfaces 100 of the first 80 and second 82 fin seal panels may be treated to facilitate sealing of the first fin seal panel 80 to the second fin seal panel 82 and formation of the first fin seal 22 (FIG. 1). Like the other steps of the disclosed method 200, the treating step 212 may be performed in-line as the partially-assembled container 8 travels along an assembly line.

Figure 8:
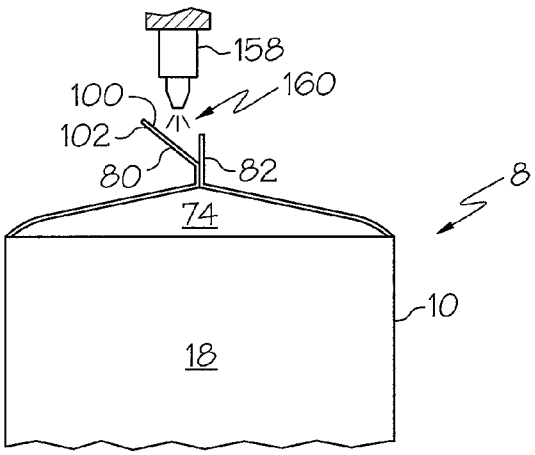
FIG. 8 is an end elevational view of the fin seal container of FIG. 7, shown during a treating step.
Figure 9:
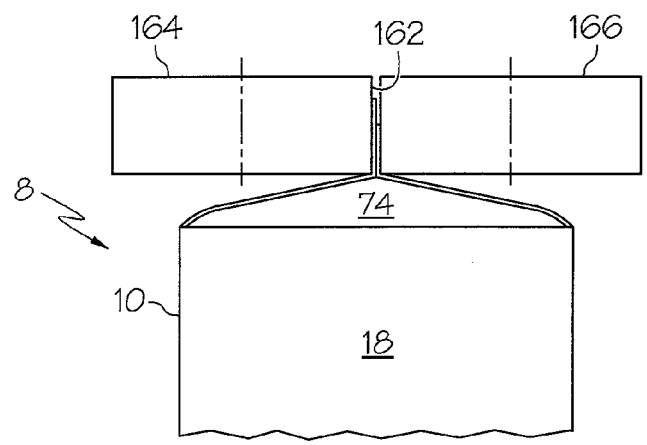
FIG. 9 is an end elevational view of the fin seal container of FIG. 8, shown during a compression step.

In a first embodiment, the treating step 212 may be a heat-treating step that increases the temperature of the inner surfaces 100 of the first 80 and second 82 fin seal panels faster than the corresponding outer surfaces 102. For example, as shown in FIG. 8, a nozzle 158, such as the nozzle of a heat gun, may direct heated air 160 into contact with the inner surfaces 100 of the first 80 and second 82 fin seal panels. At this point, those skilled in the art will appreciate that the temperature of the heated air may be a controllable process variable that may depend on, among other things, the heat-sealable material being used and, if applicable, the speed at which the partially assembled container 8 is travelling relative to the nozzle 158.

In a second embodiment, the treating step 212 may include applying an adhesive to the exposed inner surfaces 100 of the first 80 and second 82 fin seal panels. For example, a suitable adhesive may be a hot melt adhesive.

At block 214, the treated first 80 and second 82 fin seal panels may be pressed together to form a fin seal 22 (FIG. 1). For example, after the treating step shown in FIG. 8, the treated fin seal panels 80, 82 of the partially assembled container 8 may pass through the nip 162 of two compression rollers 164, 166, which may urge the treated fin seal panels 80, 82 together to form the final fin seal 22. As another example, the treated first 80 and second 82 fin seal panels may be pressed together with bars, jaws or the like.

Figure 10:
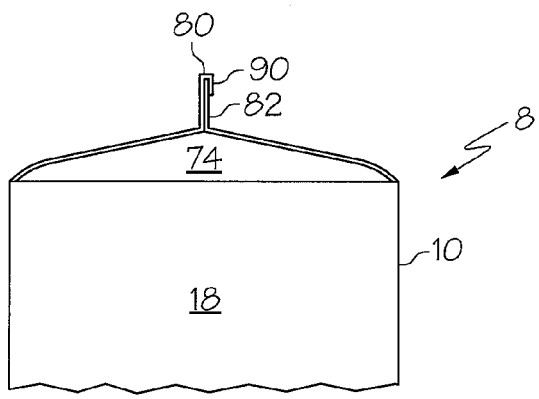
FIG. 10 is an end elevational view of the fin seal container of FIG. 9, shown after an additional folding step.

Optionally, as shown at block 216 and in FIG. 10, the extension portion 90 of the first fin seal panel 80 may be folded over the second fin seal panel 82. Additional optional processing steps, such as folding over the fin seal 22, may also be performed without departing from the scope of the present disclosure.

Accordingly, the disclosed method 200 may improve assembly time for fin seal containers by directly heating the inner surfaces of the first 80 and second 82 fin seal panels that form the fin seal 22.

Although various aspects of the disclosed fin seal container and method have been shown and described, modifications may occur to those skilled in the art upon reading the specification. The present application includes such modifications and is limited only by the scope of the claims.

What is claimed is:

1. A method for assembling a fin seal container comprising the steps of:
   folding a container blank into a three-dimensional body that defines an internal volume and includes an end portion that defines an opening into said internal volume, said end portion including a first fin seal panel having inner and outer major surfaces and a second fin seal panel having inner and outer major surfaces;

folding said end portion such that said inner major surface of said first fin seal panel is positioned adjacent to said inner major surface of said second fin seal panel;

separating said first fin seal panel from said second fin seal panel;

with said first and said second fin seal panels separated, treating at least one of said inner major surface of said first fin seal panel and said inner major surface of said second fin seal panel; and after said treating step, pressing said first fin seal panel into engagement with said second fin seal panel;

wherein said first fin seal panel comprises a pre-formed fold line;

wherein said separating step comprises pivoting a portion of said first fin seal panel about said pre-formed fold line; and wherein the pre-formed fold line is sufficiently below the top edge of said second fin seal panel so that a sufficient amount of the inner surfaces of the first and second seal panels are exposed.

2. The method of claim 1 wherein at least one of said inner major surface of said first fin seal panel and said inner major surface of said second fin seal panel comprises a heat-sealable material.

3. The method of claim 2 wherein said heat-sealable material comprises polyethylene.

4. The method of claim 1 wherein said first fin seal panel includes an extension portion that extends a distance beyond said second fin seal panel.

5. The method of claim 4 wherein said separating step comprises engaging said extension portion.

6. The method of claim 4 further comprising the step of folding said extension portion over said second fin seal panel.

7. The method of claim 1 wherein said treating step comprises heat treating at least one of said inner major surface of said first fin seal panel and said inner major surface of said second fin seal panel.

8. The method of claim 7 wherein, during said heat treating step, said inner major surface of said first fin seal panel reaches a target temperature prior to said outer major surface of said first fin seal panel reaching said target temperature.

9. The method of claim 1 wherein said treating step comprises the step of applying an adhesive to at least one of said inner major surface of said first fin seal panel and said inner major surface of said second fin seal panel.

10. The method of claim 1 wherein said pressing step is performed with compression rollers.

11. The method of claim 1 wherein said first fin seal panel has a first width and said second fin seal panel has a second width, said second width being at most 90 percent of said first width.

12. A method for assembling a fin seal container comprising the steps of:

folding a container blank into a three-dimensional body that defines an internal volume and includes an end portion that defines an opening into said internal volume, said end portion including a first fin seal panel having an extension portion, a pre-formed fold line, an inner major surface and an outer major surface and a second fin seal panel having inner and outer major surfaces, wherein said inner major surface of said first fin seal panel and said inner major surface of said second fin seal panel are coated with a heat-sealable material;

folding said end portion such that said inner major surface of said first fin seal panel is positioned adjacent to, and in generally parallel alignment with, said inner major surface of said second fin seal panel;

engaging said extension portion to pivot said extension portion about said pre-formed fold line away from said second fin seal panel;

after said engaging step, heat-treating at least one of said inner major surface of said first fin seal panel and said inner major surface of said second fin seal panel; and after said heat-treating step, pressing said first fin seal panel into engagement with said second fin seal panel.

13. A method for assembling a fin seal container comprising the steps of:

folding a container blank into a three-dimensional body that defines an internal volume and includes an end portion that defines an opening into said internal volume, said end portion including a first fin seal panel having inner and outer major surfaces and a second fin seal panel having inner and outer major surfaces;

folding said end portion such that said inner major surface of said first fin seal panel is positioned adjacent to said inner major surface of said second fin seal panel;

separating said first fin seal panel from said second fin seal panel;

with said first and said second fin seal panels separated, treating at least one of said inner major surface of said first fin seal panel and said inner major surface of said second fin seal panel; and after said treating step, pressing said first fin seal panel into engagement with said second fin seal panel;

wherein said first fin seal panel includes an extension portion that extends a distance beyond said second fin seal panel; and wherein said separating step comprises engaging said extension portion without engaging said second fin seal panel.

* * * * *